US011501142B1

(12) United States Patent
Wu et al.

(10) Patent No.: US 11,501,142 B1
(45) Date of Patent: Nov. 15, 2022

(54) TILING CONTROL CIRCUIT FOR DOWNLOADING AND PROCESSING AN INPUT TILE BASED ON SOURCE AND DESTINATION BUFFER AVAILABILITY

(71) Applicant: Xilinx, Inc., San Jose, CA (US)

(72) Inventors: Victor J. Wu, Los Gatos, CA (US); Poching Sun, San Jose, CA (US); Thomas A. Branca, Los Gatos, CA (US); Justin Thant Hsin Oo, San Jose, CA (US)

(73) Assignee: XILINX, INC., San Jose, CA (US)

( * ) Notice: Subject to any disclaimer, the term of this patent is extended or adjusted under 35 U.S.C. 154(b) by 850 days.

(21) Appl. No.: 16/374,451

(22) Filed: Apr. 3, 2019

(51) Int. Cl.
*G06N 3/063* (2006.01)
*G06F 9/30* (2018.01)
*G06F 3/06* (2006.01)
*G06F 9/38* (2018.01)

(52) U.S. Cl.
CPC ........... *G06N 3/063* (2013.01); *G06F 3/0656* (2013.01); *G06F 9/30101* (2013.01); *G06F 9/38* (2013.01)

(58) Field of Classification Search
CPC .......... G06F 9/00; G06F 9/30101; G06F 9/38; G06F 3/0656; G06N 3/063
See application file for complete search history.

(56) References Cited

U.S. PATENT DOCUMENTS 4,387,365 A * 6/1983 Berry ...................... G01S 7/298 342/185
5,568,614 A * 10/1996 Mendelson ............ H04N 19/42 710/22
7,653,710 B2 * 1/2010 Scheuermann ....... G06F 3/0659 718/102
7,895,390 B1 * 2/2011 Olson ...................... G06F 5/06 710/36
10,346,093 B1 * 7/2019 Wu ...................... G06F 3/0656
10,963,295 B2 * 3/2021 Feehrer ............... G06F 11/1004
2019/0130269 A1 * 5/2019 Nicol ....................... G06F 7/00

* cited by examiner

*Primary Examiner* — David J. Huisman
(74) *Attorney, Agent, or Firm* — Crawford Maunu PLLC

(57) ABSTRACT

A download dispatch circuit initiates download of an input tile of an input feature map in response to a source buffer of two or more source buffers being available for the input tile, and indicates that the input tile is available in response to completion of the download. An operation dispatch circuit initiates a neural network operation on the input tile in response to the input tile being available and a first destination buffer of two or more destination buffers being available for an output tile of an output feature map, and indicates that the output tile is available in response to completion of the neural network operation. An upload dispatch circuit initiates upload of the output tile to the output feature map in response to the output tile being available, and indicates that the first destination buffer is available in response to completion of the upload.

20 Claims, 5 Drawing Sheets

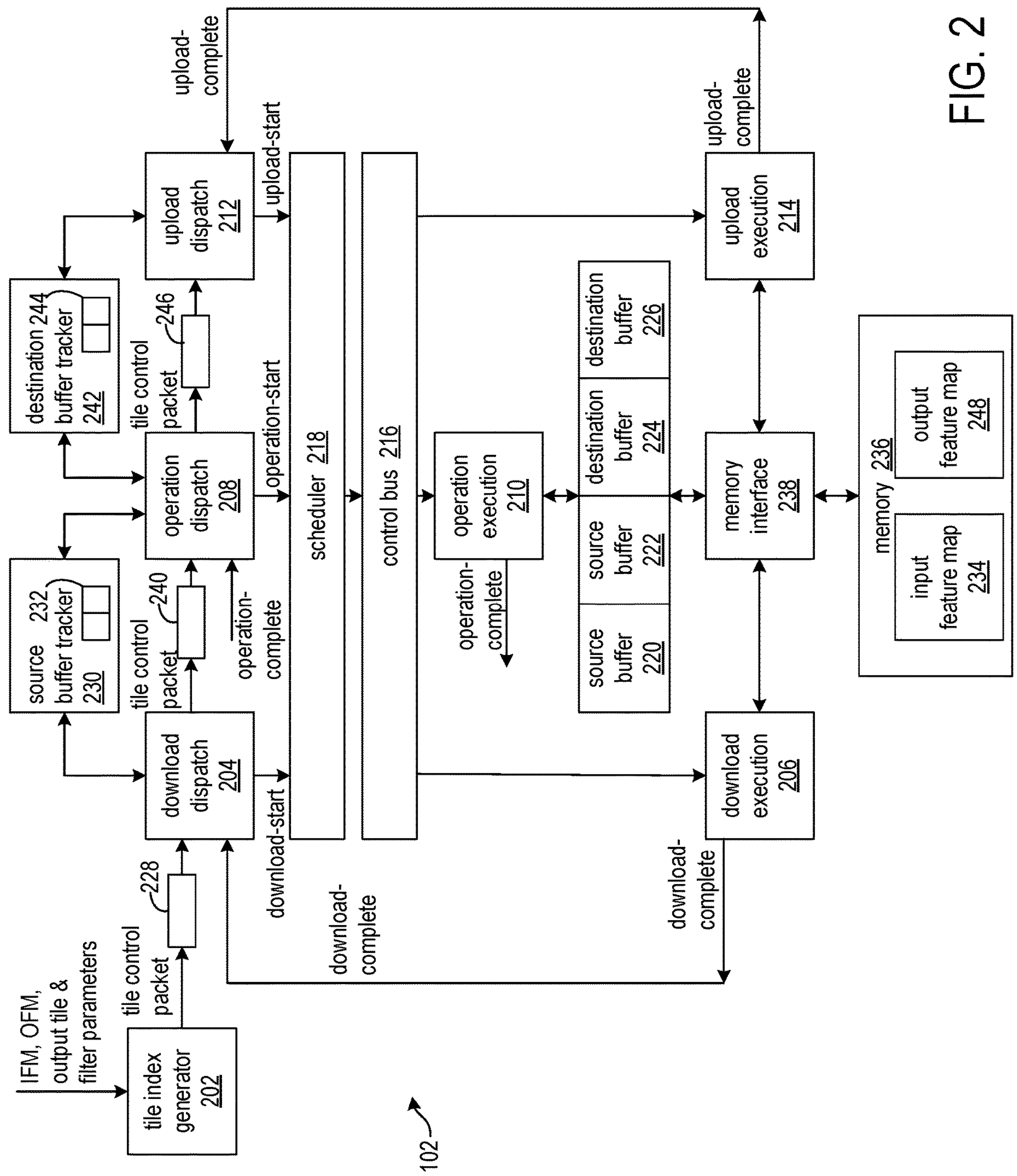
IFM, OFM, output tile & filter parameters
tile index generator 202
tile control packet
228
download dispatch 204
tile control packet
240
operation dispatch 208
tile control packet
246
upload dispatch 212
source buffer tracker 230
232
destination buffer tracker 242
244
download-start
operation-start
upload-start
operation-complete
upload-complete
download-complete
scheduler 218
control bus 216
operation execution 210
operation-complete
source buffer 220
source buffer 222
destination buffer 224
destination buffer 226
download execution 206
memory interface 238
upload execution 214
download-complete
upload-complete
memory 236
input feature map 234
output feature map 248
102
FIG. 2

TILING CONTROL CIRCUIT FOR DOWNLOADING AND PROCESSING AN INPUT TILE BASED ON SOURCE AND DESTINATION BUFFER AVAILABILITY

TECHNICAL FIELD

The disclosure generally relates to tiling feature maps in neural networks.

BACKGROUND

Input feature maps to convolutional neural networks are sometimes divided into tiles and the tiles are individually processed, because memory resources may be insufficient to store the entire input feature map during processing. Convolutional neural networks are sometimes implemented with pipelined hardware to improve throughput. Control over the tiling and pipeline can be directed by a processor executing program code. However, software controlled pipelines rely on well-defined and flexible interfaces with the hardware in order to indicate how tasks should be scheduled in the pipeline. Software control can thereby be complex and result in poor performance unless the software is specifically configured to take full advantage of the hardware architecture and given fine-grained control over features of the hardware architecture that can maximize parallel processing and throughput.

SUMMARY

A disclosed circuit arrangement includes a download dispatch circuit, an operation dispatch circuit, and an upload dispatch circuit. The download dispatch circuit configured to initiate download of an input tile of an input feature map in response to a source buffer of two or more source buffers being available for the input tile, and indicate that the input tile is available in response to completion of the download. The operation dispatch circuit is configured to initiate a neural network operation on the input tile in response to the input tile being available and a destination buffer of two or more destination buffers being available for an output tile of an output feature map, and indicate that the output tile is available in response to completion of the neural network operation. The upload dispatch circuit is configured to initiate upload of the output tile to the output feature map in response to the output being available, and indicate that the destination buffer is available in response to completion of the upload.

A disclosed method includes activating a download circuit by a download dispatch circuit to download of an input tile from a memory to a source buffer of two or more source buffers in response to availability of the source buffer. The download dispatch circuit signals that an input tile is available in the source buffer in response to completion of the download. The method activates an operation circuit by an operation dispatch circuit to perform a neural network operation on the input tile in response to availability of the input tile in the source buffer and availability of a destination buffer of two or more destination buffers. The operation circuit stores an output tile in the destination buffer. The operation dispatch circuit signals that the source buffer is available and the output tile is available in the destination buffer in response to completion of the neural network operation. The method activates an upload circuit by an upload dispatch circuit to upload the output tile from the destination buffer to a memory in response to the output tile being available in the destination buffer. The upload dispatch circuit signals that the destination buffer is available in response to completion of the upload.

Other features will be recognized from consideration of the Detailed Description and Claims, which follow.

BRIEF DESCRIPTION OF THE DRAWINGS

Various aspects and features of the circuit and method will become apparent upon review of the following detailed description and upon reference to the drawings in which:

FIG. 2 shows a circuit diagram of a neural network processing circuit having pipeline control circuitry for pipeline processing of tiles of an IFM;

DETAILED DESCRIPTION

Figure 1:
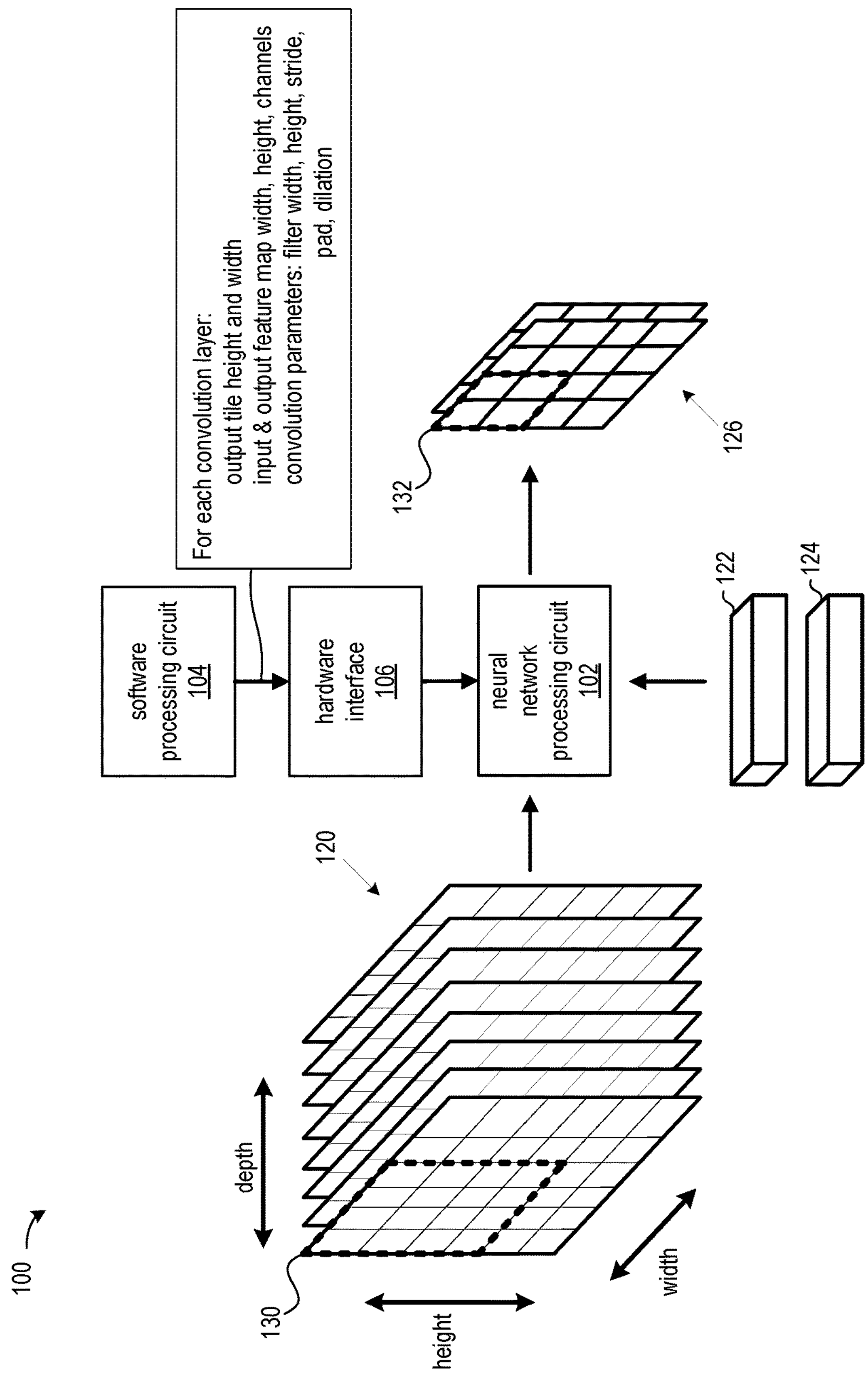
FIG. 1 shows a system and dataflow for performing neural network operations on an input feature map (IFM) consistent with the disclosed pipeline control circuitry.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods use multiple dispatch circuits to control download and convolution of tiles of an input feature map (IFM), and upload of tiles of an output feature map (OFM). In addition, a tile index generator determines boundaries of tiles within the IFM based on dimensions of an output tile and dimensions of the IFM, OFM, and filters (also "kernels"). The circuitry can also include multiple source buffers and multiple destination buffers in further support of efficient pipelined processing.

The disclosed pipeline control circuit generally includes a download dispatch circuit, an operation dispatch circuit, and an upload circuit. The dispatch circuits signal execution circuits to begin operation when buffer storage is available to perform the operation. The download dispatch circuit signals a download execution circuit to commence download of a tile of an IFM in response to a source buffer being available for download of an input tile. When download is complete, the download dispatch circuit signals to the operation dispatch circuit that an input tile is available for convolution processing. The operation dispatch circuit signals an operation execution circuit to start a convolution operation in response to the input tile being available and a destination buffer being available for storage of a tile of the OFM. Once the operation dispatch circuit receives a signal indicating that the operation is complete, the operation dispatch circuit signals the upload dispatch circuit that an output tile is available for upload. The upload dispatch circuit signals an upload execution circuit to commence uploading the output tile in response to an output tile being available. Other aspects of the pipeline control circuitry will become apparent in the description that follows.

FIG. 1 shows a system 100 and dataflow for performing neural network operations on an IFM consistent with the disclosed pipeline control circuitry. The disclosed pipeline control circuitry (e.g., FIG. 2) operates within the neural network processing circuit 102 and is responsive to tile parameters provided by the software processing circuit 104 through the hardware interface 106. The pipeline control circuitry divides the IFM 120 into IFM tiles, based on dimension of the output tiles, IFMs, OFMs, and filters provided by the software processing circuit, so that neural network operations can be performed on subsets of the data elements of IFMs that fit within on-chip memory available to the neural network processing circuit.

The system generally inputs an exemplary IFM 120, performs neural network operations on the IFM using filters 122, 124, and outputs OFM 126. The width of the exemplary IFM 120 is 6, the height of the IFM 120 is 6, and the depth of the IFM 120 is 8. The width of the exemplary filters 122 and 124 is 3, the height of the filters 122 and 124 is 3, and the depth of the filters 122 and 124 is 8. The width of the OFM 126 is 4, the height of the OFM 126 is 4, and the depth of the OFM 126 is 2. The output tile size is chosen by a software compiler based on size constraints on buffers within the neural network processing circuit 104. An exemplary output tile can have a height of 2 and a width of 2, and the input tiles can have a height of 4 and a width for 4.

The software processing circuit 104, such as a computer system executing a neural network application, can control the overall operation of the layers of a neural network. For each layer, the software processing circuit provides parameters from which the pipeline control circuitry can determine input tile dimensions and addresses, download the input tiles, perform neural network operations on the tiles, and then upload output tiles. The software processing circuit 104 determines for each convolution layer the values of parameters for the output tile, IFM, OFM, and filters and provides the parameter values to the neural network processing circuit. The parameters include the height and width of the output tile; the height, width, and depth of the IFM; the height, width, and depth of the OFM; the height, width, and depth of the filters; and the stride, pad, and dilation.

Tile 130, which is bounded by the dashed block, is an example of one of the input tiles of the IFM 120 whose address is determined and whose contents are downloaded by the pipeline control circuitry within the neural network processing circuit 102, and tile 132 is an example of an output tile of the OFM 126. The pipeline control circuitry addresses and downloads other input tiles of the IFM until processing of the IFM is completed based on the output tile, IFM, OFM, and filter parameter values provided by the software processing circuit 104.

FIG. 2 shows a circuit diagram of a neural network processing circuit 102 having pipeline control circuitry for pipeline processing of tiles of an IFM. For each layer of a neural network layer, the IFM can be partitioned into smaller 2-dimensional tiles based on the size of an output tile as specified by the software processing circuit 104 (FIG. 1) through an application programming interface (API). The software processing circuit provides the output tile dimensions, dimensions of the IFM, dimensions of the OFM, and dimensions of the filter to the tile index generator 202 of the pipeline control circuitry. The tile index generator produces the input tile dimensions as a function of the input parameters. In other words, the tile generator can calculate the minimum size input tile needed to produce all the data of the requested output tile. The tile index generator can calculate and produce new sets of input tile indices over multiple cycles. A new set of input tile indices is generated for every legal and unique output tile derived from the OFM.

The dispatch circuits 204, 208, and 212 initiate operations of the execution circuits 206, 210, and 214 based on arbitrated control of the control bus 216 by the scheduler circuit 218, availability of buffers 220, 222, 224, and 226, and completion of a preceding task in the pipeline. The download dispatch circuit 204 signals the download execution circuit 206 when an input tile of the IFM can be downloaded, the operation dispatch circuit 208 signals the operation execution circuit 210 when neural network operations can be performed on a downloaded input tile, and upload dispatch circuit 212 signals upload execution circuit when an output tile is complete and can be uploaded.

The tile index generator circuit 202 generates a sequence of control packets in response to an input instruction that specifies dimensions of an output tile, dimensions of the IFM and OFM, and dimensions of the filters. Each tile control packet includes a set of indices that reference a portion of an input feature map. The tile index generator generates new tile control packets until the end of the IFM has been reached. The tile control packets are provided from the tile index generator to the download dispatch circuit 204 through pipeline register 228. The tile index generator circuit can signal back to the software processing circuit (104, FIG. 1) that the last input tile has been processed and signal when that last tile has passed through the pipeline and upload of the output tile is complete.

In response to a new tile control packet being available in the pipeline register 228 and one of the source buffers 220 or 222 being available, the download dispatch circuit 204 requests control of the control bus 216 to start the download execution circuit 206. The download dispatch circuit 204 and the operation dispatch circuit 208 coordinate use of the source buffers 220 and 222 through the source buffer tracker circuit 230.

In an exemplary approach, the source buffers 220 and 222 are used as ping-pong buffers by the download execution circuit 206 and the operation execution circuit 210. While one of the download execution circuit 206 and the operation execution circuit 210 is accessing one of the source buffers, the other one of the download execution circuit or the operation execution circuit can access the other one of the source buffers.

The source buffer tracker circuit 230 can store respective status values associated with the source buffers 220 and 222. Each status value indicates availability of the associated source buffer for download of an input tile or availability of an input tile in the associated source buffer. In a pipeline control circuit that includes two source buffers, the source buffer tracker circuit can have ping-pong registers 232 that store the respective status values associated with the two source buffers 220 and 222. The ping-pong registers are writeable by the download dispatch circuit 204 to indicate availability of an input tile, and writeable by the operation dispatch circuit 208 to indicate availability of a buffer for downloading an input tile.

In response to the scheduler circuit 218 granting control of the control bus 216 to the download dispatch circuit 204, the download dispatch circuit signals to the download execution circuit 206 to begin downloading an input tile.

The download dispatch circuit 204 provides the tile control packet and indicates one of the source buffers 220 or 222 to the download execution circuit so that the download execution circuit can address and read the desired portion of the input feature map 234 from the memory 236 and store the tile into the available one of the source buffers 220 or 222. The memory interface 238 provides read access to the memory 236 to access the IFM 234, and the memory interface can write data to the source buffer enabled by the download execution circuit 206. The memory 236 can be one or more random access memories off-chip from the neural network processing circuit, for example.

In response to completion of downloading an input tile into one of the source buffers, the download execution circuit 206 asserts a download-complete signal to the download dispatch circuit. In response to the download-complete signal, the download dispatch circuit 204 signals to the operation dispatch circuit 208 that an input tile is available in one of the source buffers 220 or 222, and signals to the tile index generator that it can accept another tile control packet. The download dispatch circuit signals availability of an input tile by indicating the status in the one of the ping-pong registers 232 associated with the one of the source buffers. The tile control packet associated with the downloaded input tile is forwarded to the pipeline register 240 for use by the operation dispatch circuit 208. When one of the source buffers is available, the download dispatch circuit can signal the download execution circuit to download another input tile.

The operation dispatch circuit 208 can signal the operation execution circuit 210 to commence a performing a neural network operation in response to the source buffer tracker circuit 230 indicating that an input tile is available and the destination buffer tracker circuit 242 indicating that a destination buffer is available to hold the output tile.

In response to an input tile being available in one of the source buffers 220 or 222 and one of the destination buffers 224 or 226 being available, the operation dispatch circuit 208 requests control of the control bus 216 to start the operation execution circuit 210. The operation dispatch circuit 208 and the upload dispatch circuit 212 coordinate use of the destination buffers 224 and 226 through the destination buffer tracker circuit 242.

In an exemplary approach, the destination buffers 224 and 226 are used as ping-pong buffers by the operation execution circuit 210 and the upload execution circuit 214. While one of the operation execution circuit and the upload execution circuit is accessing one of the destination buffers, the other one of the operation execution circuit and the upload execution circuit is accessing the other one of the destination buffers.

The destination buffer tracker circuit 242 can store respective status values associated with the destination buffers 224 and 226. Each status value indicates availability of the associated destination buffer for use by the operation execution circuit 210 or upload by the upload execution circuit 214. In a pipeline control circuit that includes two destination buffers, the destination buffer tracker circuit can have ping-pong registers 244 that store the respective status values associated with the two destination buffers 224 and 226. The ping-pong registers are writeable by the operation dispatch circuit 208 to indicate availability an output tile, and writeable by the upload dispatch circuit 212 to indicate availability of a destination buffer for use by the operation execution circuit 210.

In response to the scheduler circuit 218 granting control of the control bus 216 to the operation dispatch circuit 208, the operation dispatch circuit signals to the operation execution circuit 210 to begin performing the neural network operation on the input tile. The operation dispatch circuit provides the tile control packet from the pipeline register 240 and indicates one of the source buffers 220 or 222 and one of the destination buffers 224 or 226 to the operation execution circuit so that the operation execution circuit can read the input tile from one of the source buffers 220 or 222 and store the output tile in one of the destination buffers 224 or 226. The operation execution circuit can be an array of multiple and accumulate circuits configured to perform neural network operations such as convolution.

In response to completion of generating an output tile and storing the output tile in one of the destination buffers 224 or 226, the operation execution circuit 210 asserts an operation-complete signal to the operation dispatch circuit 208. In response to the operation-complete signal, the operation dispatch circuit signals to the upload dispatch circuit 212 that an output tile is available in one of the destination buffers. The operation dispatch circuit signals availability of an output tile by indicating the status in the one of the ping-pong registers 244 associated with the one of the destination buffers. The tile control packet associated with the completed processing of the input tile is forwarded to the pipeline register 246 for use by the upload dispatch circuit 212. When one of the destination buffers is available and an input tile is available in one of the source buffers 220 or 222, the operation dispatch circuit can signal the operation execution circuit to commence a neural network operation on another input tile.

The upload dispatch circuit 212 can signal the upload execution circuit 214 to commence uploading an output tile from one of the destination buffers 224 or 226 response to the destination buffer tracker circuit 242 indicating that an output tile is available. In response to an output tile being available in one of the destination buffers, the upload dispatch circuit requests control of the control bus 216 to start the upload execution circuit 214.

In response to the scheduler circuit 218 granting control of the control bus 216 to the upload dispatch circuit 212, the upload dispatch circuit signals to the upload execution circuit 214 to begin uploading the output tile from one of the destination buffers 224 or 226 to the memory 236. The upload dispatch circuit provides the tile control packet and indicates one of the destination buffers to the upload execution circuit so that the upload execution circuit can read the output tile from one of the destination buffers and store the output tile as part of the output feature map 248. The memory interface 238 provides read access to the destination buffers 224 and 226 as enabled by the upload execution circuit, and write access to memory 236 for the upload execution circuit to write to the OFM 248.

In response to completion of uploading an output tile to the memory 236, the upload execution circuit 214 asserts an upload-complete signal to the upload dispatch circuit 212. In response to the upload-complete signal, the upload dispatch circuit signals to the operation dispatch circuit 208 that a destination buffer is available. The upload dispatch circuit signals availability of an a destination buffer by indicating the status in the one of the ping-pong registers 244 associated with the one of the destination buffers from which the output tile was uploaded. When the destination buffer tracker indicates that an output tile is available in one of the destination buffers, the upload dispatch circuit can signal the upload execution circuit to commence uploading another output tile.

Though the exemplary approach uses two source buffers and two destination buffers and controls access by using the ping-pong registers 232 and 244, other approaches could employ more than two source buffers and/or more than two destination buffers. Such applications could have for each set of buffers a corresponding number of associated status registers to indicate availability. The buffers can be implemented by dual-ported random access memory blocks, for example.

The scheduler circuit 218 manages the requests from the dispatch circuits 204, 208, and 212 and grants one of the requesters control of the control bus 216 at a time. The upload dispatch circuit 212 is given highest priority for access to the control bus, followed by the operation dispatch circuit 208, and then the download dispatch circuit 204. The priority order enforces a processing order of first processing the oldest tile in the pipeline.

Figure 3:
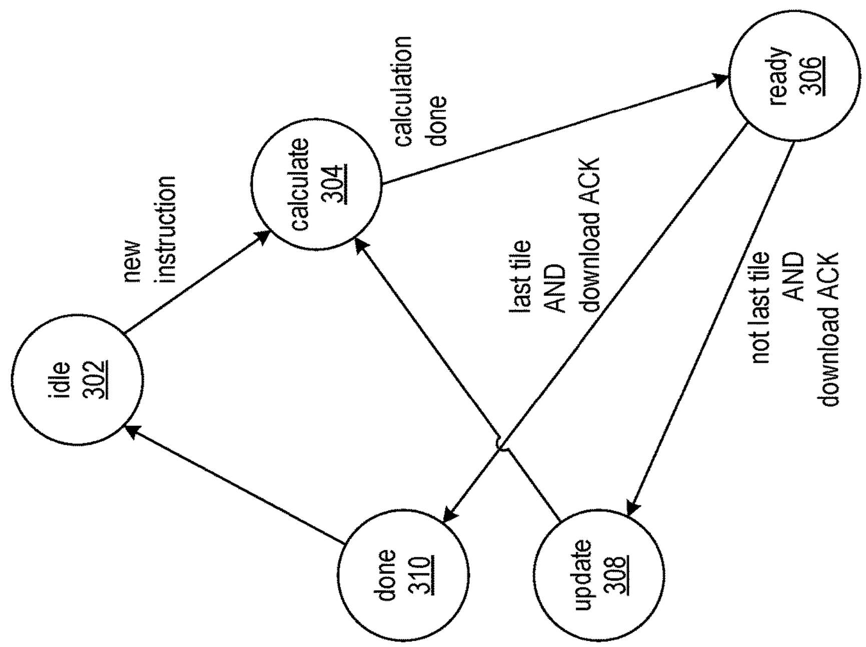
FIG. 3 shows a state diagram of the tile index generator circuit.

FIG. 3 shows a state diagram of the tile index generator circuit. Then tile index generator iterates over the input feature map, generating tile control packets until all the data of the IFM needed to produce the desired output feature map (OFM) has been processed. In idle state 302, the tile index generator circuit waits for a new instruction that specifies the parameters needed to generate a tile control packet.

When a new instruction is received, the tile index generator circuit transitions to calculate state 304. In the calculate state, the tile index generator circuit determines a set of indices that reference a portion of an IFM in the memory. The tile index generator determines a capped input tile size based on a given output tile size along with the other parameters of the convolution. The calculation is only for 1 dimension. For a 3D feature map, the algorithm is executed twice to calculate both the width and height dimensions separately. The depth dimension of the tile is maintained to be equal to the IFM. The size of the input tile is "capped" in that the input tile size is restricted to only valid values of the input, because the function can produce indices that lie outside the dimensions of the IFM.

The instruction parameters used by the tile index generator circuit in determining the indices of each input tile in the IFM generally include the height and width of an output tile, the height, width, and number of channels of the OFM, the height, width and number of channels of the IFM, and convolution parameters including the height and width of the filter, stride, padding, and dilation. The following parameters are input to the tile generator circuit:

IFM=Input Size (full height, width, and depth dimensions)
OFM=Output Size (full height, width, and depth dimensions)
OS=Output Start Index of output tile
OE=Output End Index of output tile
IS=Input Start Index of input tile
IE=Input End Index of input tile
S=Kernel Stride
P=Kernel Pad
D=Dilation (1 means no dilation)
K=Kernel Size (height, width, and depth)
EK=Effective Kernel Size=K+(K−1)*(D−1)=D*(K−1)+1

The tile index generator circuit generates the following values that are used by the download execution circuit, operation execution circuit, and upload execution circuit (FIG. 2):

IS_CAP=Input Start Index, capped to positive values
IE_CAP=Input End Index, capped to full Input Size
IT_CAP=Input Tile Size, after capping
IS=S*OS−P
IE=S*OE−P+EK−1
IS_CAP=(IS<0)? 0: IS
IE_CAP=(IE>=IFM)? IFM−1: IE
IT_CAP=IE_CAP−IS_CAP+1

The values calculated by the tile index generator circuit in the calculate state 304 are stored in a tile control packet and provided to the download dispatch circuit as described above.

The tile index generator circuit transitions from the calculate state 304 to the ready state 306 when a tile control packet is complete. In the ready state, the tile index generator circuit determines whether another set of indices for an input tile need to be generated. The tile index generator circuit transitions from ready state 306 to update state 308 if the last input tile of the IFM has not been processed. Otherwise, the tile index generator circuit transitions to done state 310, and then to idle state 302 to await another instruction.

In the update state 308, the tile index generator circuit resolves counters that track the number of tiles remaining to generate. From the update state 308, the tile index generator circuit transitions to the calculate state 304 to compute another set of input tile indices.

Figure 4:
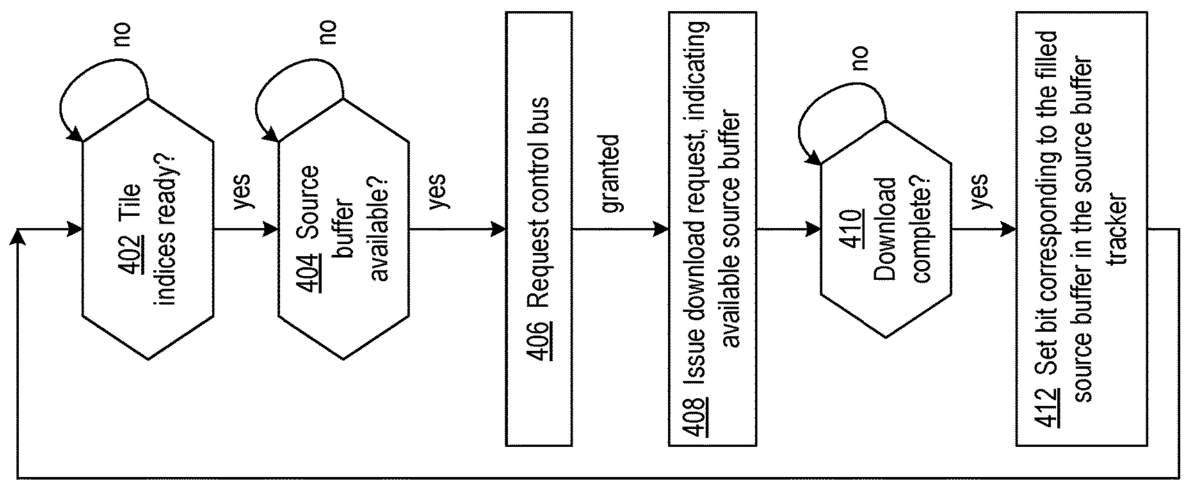
FIG. 4 shows a flowchart of a process performed by the download dispatch circuit.

FIG. 4 shows a flowchart of a process performed by the download dispatch circuit. At decision block 402, the download dispatch circuit determines whether a set of tile indices is available to be processed. The availability can be indicated by a tile control packet in the pipeline register 228 (FIG. 2), for example. The download dispatch circuit waits at decision block 402 until a set of input tile indices is available.

In response to a set of input tile indices being available, at decision block 404, the download dispatch circuit checks whether a source buffer is available for downloading the input tile. The download dispatch circuit waits at decision block 404 until a source buffer is available.

In response to a source buffer being available, at block 406 the download dispatch circuit issues a request to the scheduler circuit for access to the control bus and waits at block 406 until access is granted. Once access to the control bus is granted, at block 408 the download dispatch circuit issues the download request to the download execution circuit to indicate the available source buffer and indicate the set of indices of the input tile to download.

The download dispatch circuit at decision block 410 waits for the download execution circuit to signal that the download is complete. In response to the download-complete signal being asserted, the download dispatch circuit proceeds to block 412. At block 412, the download dispatch circuit signals to the operation dispatch circuit that an input tile is available in a source buffer by setting a register corresponding to the filled source buffer in the source buffer tracker circuit.

Figure 5:
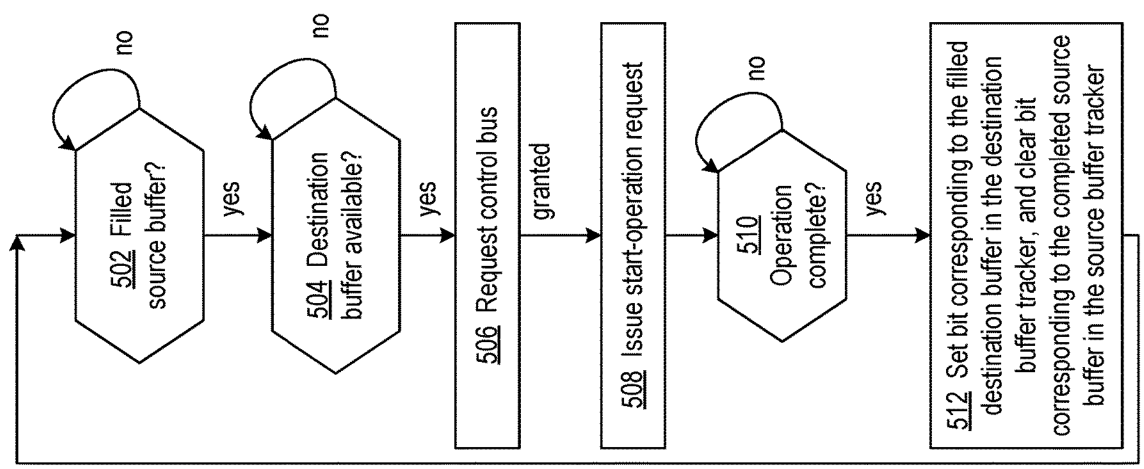
FIG. 5 shows a flowchart of a process performed by the operation dispatch circuit.

FIG. 5 shows a flowchart of a process performed by the operation dispatch circuit. At decision block 502, the operation dispatch circuit determines whether an input tile is available to be processed in a source buffer. The availability can be indicated by the state of a register in the source buffer tracker circuit (FIG. 2), for example. The operation dispatch circuit waits at decision block 502 until an input tile is available.

In response to an input tile being available, at decision block 504, the operation dispatch circuit checks whether a destination buffer is available for storing an output tile. The operation dispatch circuit waits at decision block 504 until a destination buffer is available.

In response to a destination buffer being available, at block 506 the operation dispatch circuit issues a request to the scheduler circuit for access to the control bus and waits at block 506 until access is granted. Once access to the control bus is granted, at block 508 the operation dispatch circuit issues the operation request to the operation execution circuit to indicate the available input tile in the source buffer, the available destination buffer, and indicate the set of indices of the input tile.

The operation dispatch circuit at decision block 510 waits for the operation execution circuit to signal that the operation is complete. In response to the operate-complete signal being asserted, the operation dispatch circuit proceeds to block 512. At block 512, the operation dispatch circuit signals to the upload dispatch circuit that an output tile is available in a destination buffer by setting a register corresponding to the filled destination buffer in the destination buffer tracker circuit. The operation dispatch circuit also signals to the download dispatch circuit that a source buffer is available for downloading another input tile by clearing the register corresponding to the source buffer in the source buffer tracker circuit.

Figure 6:
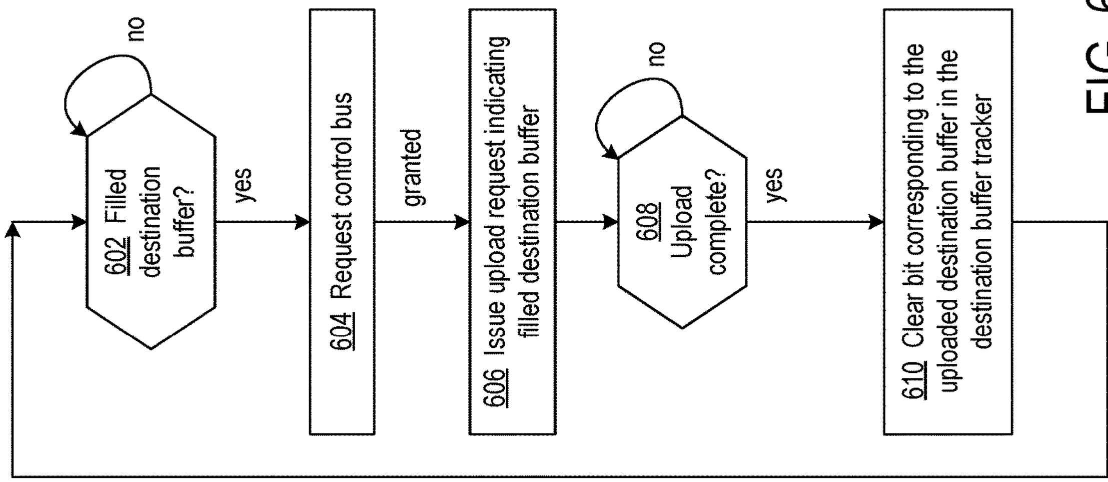
FIG. 6 shows a flowchart of a process performed by the upload dispatch circuit.

FIG. 6 shows a flowchart of a process performed by the upload dispatch circuit. At decision block 602, the upload dispatch circuit determines whether an output tile is available to be uploaded from a destination buffer. The availability can be indicated by the state of a register in the destination buffer tracker circuit (FIG. 2), for example. The upload dispatch circuit waits at decision block 602 until an input tile is available.

In response to an output input tile being available, at block 604 the upload dispatch circuit issues a request to the scheduler circuit for access to the control bus and waits at block 604 until access is granted. Once access to the control bus is granted, at block 606 the upload dispatch circuit issues the upload request to the upload execution circuit to indicate the available output tile in the destination buffer and indicate the set of indices of the input tile.

The upload dispatch circuit at decision block 608 waits for the upload execution circuit to signal that the upload is complete. In response to the upload-complete signal being asserted, the upload dispatch circuit proceeds to block 610. At block 610, the upload dispatch circuit signals to the operation dispatch circuit that a destination buffer is available by clearing the register corresponding to the destination buffer in the destination buffer tracker circuit.

Figure 7:
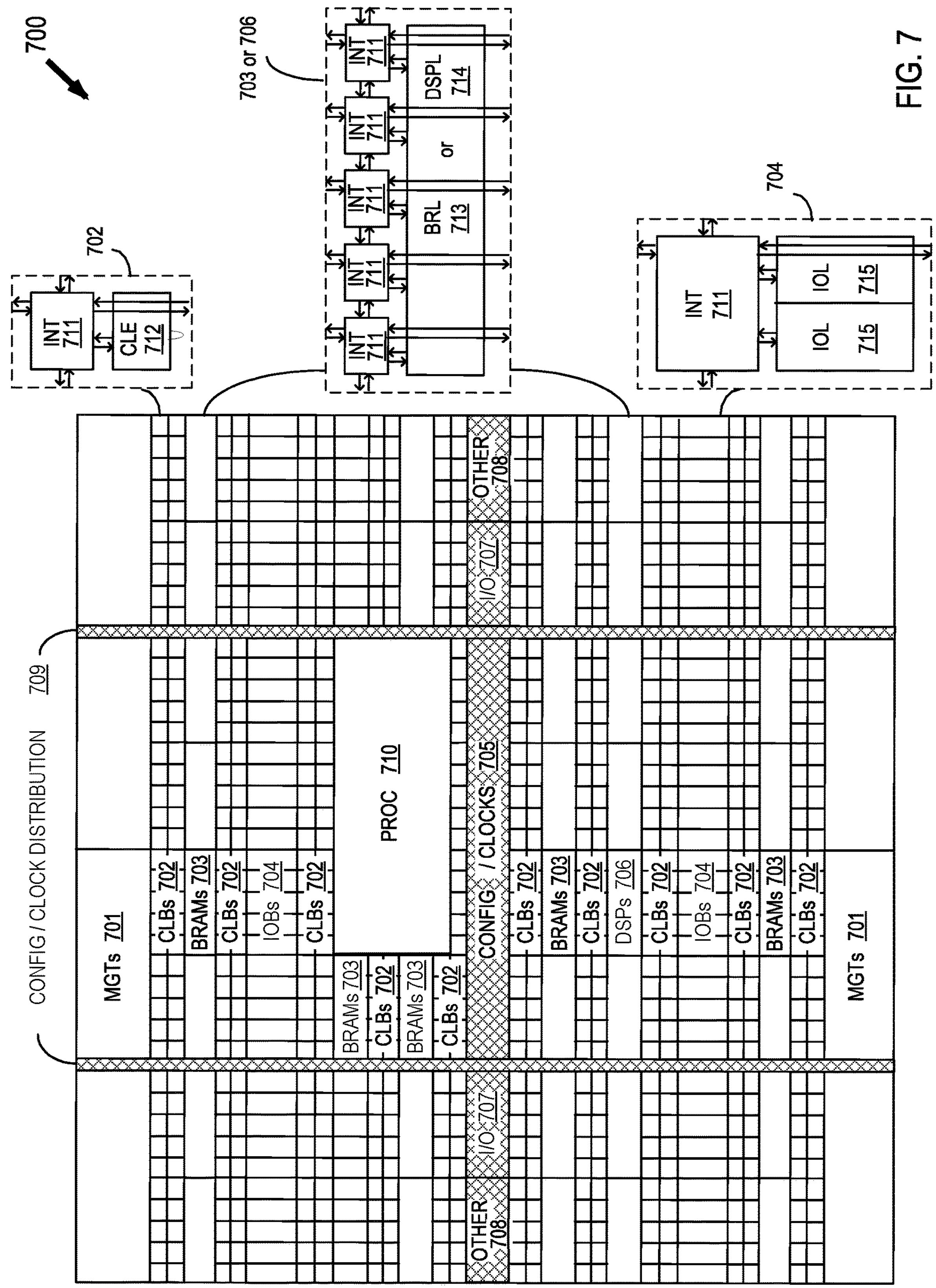
FIG. 7 shows a programmable integrated circuit (IC) on which the disclosed circuits and processes can be implemented.

FIG. 7 shows a programmable integrated circuit (IC) 700 on which the disclosed circuits and processes can be implemented. The programmable IC may also be referred to as a System On Chip (SOC) that includes field programmable gate array logic (FPGA) along with other programmable resources. FPGA logic may include several different types of programmable logic blocks in the array. For example, FIG. 7 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown). The disclosed circuit arrangements can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable; compute engines, all connected through a network on chip (NoC).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

A columnar area near the center of the die (shown shaded in FIG. 7) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 7 include additional logic blocks that disrupt the regular columnar structure making up a large part of the programmable IC. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for pipelined control of neural networks.

Other aspects and features will be apparent to those skilled in the art from consideration of the specification. The methods and system may be implemented as an application specific integrated circuit (ASIC) or as a logic on a programmable logic device. It is intended that the specification and drawings be considered as examples only, with a true scope of the invention being indicated by the following claims.

What is claimed is:

1. A circuit arrangement comprising:

a download dispatch circuit configured to:

initiate download of an input tile of an input feature map in response to a first source buffer of two or more source buffers being available for the input tile; and indicate that the input tile is available in response to completion of the download;

an operation dispatch circuit configured to:

initiate a neural network operation on the input tile in response to the input tile being available and a first destination buffer of two or more destination buffers being available for an output tile of an output feature map; and indicate that the output tile is available in response to completion of the neural network operation;

an upload dispatch circuit configured to:

initiate upload of the output tile to the output feature map in response to the output tile being available; and indicate that the first destination buffer is available in response to completion of the upload; and a scheduling circuit configured to prioritize the upload dispatch circuit over the operation dispatch circuit, and prioritize the operation dispatch circuit over the download dispatch circuit.

2. The circuit arrangement of claim 1, further comprising:

a tile index generator circuit configured to generate a set of indices that reference a portion of the input feature map and output the set of indices to the download dispatch circuit; and wherein the download dispatch circuit is configured to provide the set of indices to initiate the download.

3. The circuit arrangement of claim 2, wherein the tile index generator circuit is configured to generate a plurality of sets of indices, wherein the plurality of sets of indices reference different portions of the input feature map.

4. The circuit arrangement of claim 3, further comprising:

first pipeline registers coupled between the tile index generator circuit and the download dispatch circuit and configured to buffer the plurality of sets of indices;

second pipeline registers coupled between the download dispatch circuit and the operation dispatch circuit and configured to buffer the plurality of sets of indices; and third pipeline registers coupled between the operation dispatch circuit and the upload dispatch circuit and configured to buffer the plurality of sets of indices.

5. The circuit arrangement of claim 3, wherein the tile index generator circuit is configured to generate the plurality of sets of indices in response to dimensions of the input feature map, dimensions of the output feature map, dimensions of a kernel, a stride, and a pad.

6. The circuit arrangement of claim 2, further comprising:

a first buffer tracker circuit configured to store respective first status values associated with the two or more source buffers, each respective first status value indicative of availability of the associated source buffer for download of the input tile or availability of an input tile in the associated source buffer; and a second buffer tracker circuit configured to store respective second status values associated with the two or more destination buffers, each respective second status value indicative of availability of the associated destination buffer for an output tile or availability of an output tile in the associated destination buffer.

7. The circuit arrangement of claim 6, wherein:

the two or more source buffers are two source buffers;

the two or more destination buffers are two destination buffers;

the first buffer tracker circuit includes first ping-pong registers that store the respective first status values associated with the two source buffers, and the first ping-pong registers are writeable by the download dispatch circuit to indicate availability of an input tile, and writeable by the operation dispatch circuit to indicate availability of the two source buffers; and the second buffer tracker circuit includes second ping-pong registers that store the respective second status values associated with the two destination buffers, and the second ping-pong registers are writeable by the operation dispatch circuit to indicate availability of an output tile, and writeable by the upload dispatch circuit to indicate availability of the two destination buffers.

8. The circuit arrangement of claim 1, wherein the scheduling circuit is configured to:

grant access to a control bus for only one of the download dispatch circuit, operation dispatch circuit, and upload dispatch circuit at a time; and prioritize the upload dispatch circuit over the operation dispatch circuit for the access to the control bus, and prioritize the operation dispatch circuit over the download dispatch circuit for the access to the control bus.

9. The circuit arrangement of claim 8, further comprising:

the control bus;

the two or more source buffers;

the two or more destination buffers;

a download execution circuit coupled to the control bus and to the two or more source buffers, the download execution circuit configured to download the input tile from a memory circuit to the first source buffer;

an operation execution circuit coupled to the control bus, the two or more source buffers and the two or more destination buffers, the operation execution circuit configured to generate the output tile from the input tile and store the output tile in the first destination buffer; and an upload execution circuit coupled to the control bus and to the two or more destination buffers, the upload execution circuit configured to upload the output tile from the first destination buffer to a memory circuit.

10. The circuit arrangement of 9, further comprising:

a tile index generator circuit configured to generate a plurality of sets of indices that reference respective portions of an input feature map and output the sets indices to the download dispatch circuit, wherein:

the download dispatch circuit is configured to provide the sets of indices to the download execution circuit and to the operation dispatch circuit;

the operation dispatch circuit is configured to provide the sets of indices to the operation execution circuit and to the upload dispatch circuit; and the upload dispatch circuit is configured to provide the sets of indices to the upload execution circuit.

11. A method comprising:

activating a download execution circuit by a download dispatch circuit to download an input tile from a memory to a first source buffer of two or more source buffers in response to availability of the first source buffer;

signaling that the input tile is available in the first source buffer in response to completion of the download;

activating an operation execution circuit by an operation dispatch circuit to perform a neural network operation on the input tile in response to availability of the input tile in the first source buffer and availability of a first destination buffer of two or more destination buffers, wherein the operation execution circuit stores an output tile in the first destination buffer;

signaling that the first source buffer is available and the output tile is available in the first destination buffer in response to completion of the neural network operation;

activating an upload execution circuit by an upload dispatch circuit to upload the output tile from the first destination buffer to a memory in response to the output tile being available in the first destination buffer;

signaling that the first destination buffer is available in response to completion of the upload; and prioritizing activating the upload execution circuit over activating the operation execution circuit, and prioritizing activating the operation execution circuit over activating the download execution circuit.

12. The method of claim 11, further comprising:

generating, by a tile index generator circuit, a set of indices that reference the input tile as a portion of an input feature map;

providing the set of indices from the download dispatch circuit to the download execution circuit.

13. The method of claim 12, further comprising:

generating, by the tile index generator circuit, a plurality of sets of indices, wherein the plurality of sets of indices reference different portions of the input feature map; and providing the plurality of sets of indices to the download dispatch circuit.

14. The method of claim 13, further comprising:

buffering the plurality of sets of indices in first pipeline registers coupled between the tile index generator circuit and the download dispatch circuit;

buffering the plurality of sets of indices in second pipeline registers coupled between the download dispatch circuit and the operation dispatch circuit; and buffering the plurality of sets of indices in third pipeline registers coupled between the operation dispatch circuit and the upload dispatch circuit.

15. The method of claim 13, wherein the generating the plurality of sets of indices is based on dimensions of the input feature map, dimensions of an output feature map, dimensions of a kernel, a stride, and a pad.

16. The method of claim 12, further comprising:

storing, by a first buffer tracker circuit, respective first status values associated with the two or more source buffers, each respective first status value indicative of availability of the associated source buffer for download of the input tile or availability of an input tile in the associated source buffer; and storing, by a second buffer tracker circuit, respective second status values associated with the two or more destination buffers, each respective second status value indicative of availability of the associated destination buffer for an output tile or availability of an output tile in the associated destination buffer.

17. The method of claim 16, wherein:

the two or more source buffers are two source buffers;

the two or more destination buffers are two destination buffers;

the storing by the first buffer tracker circuit includes storing, in first ping-pong registers, the respective first status values associated with the two source buffers; and the storing by the second buffer tracker circuit includes storing, in second ping-pong registers, the respective second status values associated with the two destination buffers.

18. The method of claim 11, further comprising:

granting access to a control bus by a scheduling circuit for only one of the download dispatch circuit, operation dispatch circuit, and upload dispatch circuit at a time; and prioritizing the upload dispatch circuit over the operation dispatch circuit for the access to the control bus, and prioritizing the operation dispatch circuit over the download dispatch circuit for the access to the control bus.

19. The method of claim 11, further comprising:

downloading the input tile from a memory circuit to the first source buffer by the download execution circuit;

generating the output tile from the input tile by the operation execution circuit; and uploading the output tile from the first destination buffer by the upload execution circuit.

20. The method of 19, further comprising:

generating, by a tile index generator circuit, a plurality of sets of indices that reference respective portions of an input feature map, and providing the plurality of sets of indices to the download dispatch circuit;

providing the sets of indices from the download dispatch circuit to the download execution circuit and to the operation dispatch circuit;

providing the sets of indices from the operation dispatch circuit to the operation execution circuit and to the upload dispatch circuit; and providing the sets of indices from the upload dispatch circuit to the upload execution circuit.

* * * * *